United States Patent
Noda et al.

(10) Patent No.: US 10,625,215 B2
(45) Date of Patent: Apr. 21, 2020

(54) METHOD FOR MANUFACTURING ZEOLITE MEMBRANE STRUCTURE

(71) Applicant: NGK INSULATORS, LTD., Nagoya-Shi (JP)

(72) Inventors: Kenichi Noda, Nagoya (JP); Takeshi Hagio, Inazawa (JP); Makoto Miyahara, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 15/495,042

(22) Filed: Apr. 24, 2017

(65) Prior Publication Data

US 2017/0225130 A1    Aug. 10, 2017

Related U.S. Application Data

(63) Continuation of application No. PCT/JP2015/083070, filed on Nov. 25, 2015.

(30) Foreign Application Priority Data

Nov. 25, 2014 (JP) ................... 2014-237814

(51) Int. Cl.
*B01D 71/02* (2006.01)
*C01B 39/48* (2006.01)
(Continued)

(52) U.S. Cl.
CPC ......... *B01D 71/028* (2013.01); *B01D 53/228* (2013.01); *B01D 67/0051* (2013.01);
(Continued)

(58) Field of Classification Search
CPC ............................................. B05D 1/36–38
See application file for complete search history.

(56) References Cited

U.S. PATENT DOCUMENTS 6,037,292 A * 3/2000 Lai .................... B01D 67/0051
                                                    502/4
6,090,289 A    7/2000 Verduijn et al.
(Continued)

FOREIGN PATENT DOCUMENTS

CN      1152261 A     6/1997
JP      10-114516 A1  5/1998
(Continued)

OTHER PUBLICATIONS

English translation of the Written Opinion (Application No. PCT/JP2015/083070) dated Jun. 8, 2017.
(Continued)

*Primary Examiner* — Alex A Rolland
(74) *Attorney, Agent, or Firm* — Burr & Brown, PLLC (57) ABSTRACT

A method for manufacturing a zeolite membrane structure includes a step of forming a first zeolite membrane on a porous support by hydrothermal synthesis in a state in which the porous support is immersed in a first zeolite membrane formation solution, a step of immersing the porous support formed the first zeolite membrane for greater than or equal to 5 minutes in a second zeolite membrane formation solution at greater than or equal to 10 degrees C. and less than or equal to 70 degrees C. and greater than or equal to pH 10, and a step of forming a second zeolite membrane on the first zeolite membrane by hydrothermal synthesis in a state in which the porous support formed the first zeolite membrane is immersed in the second zeolite membrane formation solution. The first zeolite membrane and the second zeolite membrane share at least one composite building unit constituting a framework structure.

8 Claims, 2 Drawing Sheets

(51) Int. Cl.
  *B01D 69/12* (2006.01)
  *B01D 67/00* (2006.01)
  *B01D 69/10* (2006.01)
  *B01D 69/02* (2006.01)
  *B01D 53/22* (2006.01)
  *B05D 1/18* (2006.01)
  *B05D 1/36* (2006.01)
  *C01B 39/02* (2006.01)
  *C01B 39/20* (2006.01)

(52) U.S. Cl.
  CPC .......... *B01D 69/02* (2013.01); *B01D 69/105* (2013.01); *B01D 69/12* (2013.01); *B01D 69/125* (2013.01); *B01D 71/022* (2013.01); *B05D 1/18* (2013.01); *B05D 1/36* (2013.01); *C01B 39/023* (2013.01); *C01B 39/205* (2013.01); *C01B 39/48* (2013.01); *B01D 2325/24* (2013.01); *B01D 2325/38* (2013.01)

(56) References Cited

U.S. PATENT DOCUMENTS

| | | | |
|---|---|---|---|
| 6,193,784 B1 | 2/2001 | Yazawa et al. | |
| 6,936,560 B2 * | 8/2005 | Mori | B01D 53/228 502/4 |
| 7,049,259 B1 | 5/2006 | Deckman et al. | |
| 2003/0039609 A1 | 2/2003 | Tomita et al. | |
| 2009/0220414 A1 | 9/2009 | Mizuno | |
| 2012/0006194 A1 * | 1/2012 | Falconer | B01D 53/228 95/51 |
| 2014/0291245 A1 | 10/2014 | Inukai et al. | |

FOREIGN PATENT DOCUMENTS

| | | |
|---|---|---|
| JP | 2000-016809 A1 | 1/2000 |
| JP | 2007-061775 A1 | 3/2007 |
| JP | 2010-058015 A1 | 3/2010 |
| JP | 4734806 B2 | 7/2011 |
| JP | 2012-236155 A1 | 12/2012 |
| JP | 2013-212488 A1 | 10/2013 |
| JP | 2014-198308 A1 | 10/2014 |
| WO | 2001/064583 A1 | 9/2001 |

OTHER PUBLICATIONS

International Search Report and Written Opinion (Application No. PCT/JP2015/083070) dated Feb. 23, 2016.

Chinese Office Action (with English translation), Chinese Application No. 201580058430.1, dated Jul. 1, 2019 (15 pages).

* cited by examiner

METHOD FOR MANUFACTURING ZEOLITE MEMBRANE STRUCTURE

BACKGROUND OF THE INVENTION

1. Field of the Invention

The present invention relates a method for manufacturing a zeolite membrane structure comprising a stacked zeolite membrane.

2. DESCRIPTION OF RELATED ART

A typical zeolite membrane structure is known in which a FAU zeolite membrane and a hydrophobic zeolite membrane are sequentially stacking on a porous support (For example, reference is made to Japanese Patent Application Laid-Open No. 2012-236155). A silicalite membrane or DDR-type zeolite membrane is used as the hydrophobic zeolite membrane.

A hydrophobic zeolite membrane is formed using hydrothermal synthesis by crystal growth of a seed crystal deposited on the FAU zeolite membrane.

SUMMARY OF THE INVENTION

Technical Problem

However, when a hydrophobic zeolite membrane is formed on the FAU zeolite membrane by hydrothermal synthesis as disclosed in Japanese Patent Application Laid-Open No. 2012-236155, there is a problem that the denseness and adhesion characteristics of the hydrophobic zeolite membrane are reduced and therefore membrane defects tend to occur. This problem is not limited to the combination of a FAU zeolite membrane and a hydrophobic zeolite membrane, and commonly occurs when stacking zeolite membranes.

The present invention is proposed based on the new insight above, and has the object of providing a manufacturing method for a zeolite membrane structure that is configured to enable suppression of membrane defects.

Solution to Problem

The method for manufacturing a zeolite membrane structure according to the present invention comprises a step of forming a first zeolite membrane on a porous support by hydrothermal synthesis in a state in which the porous support is immersed in a first zeolite membrane formation solution, a step of immersing the porous support formed the first zeolite membrane for greater than or equal to 5 minutes in a second zeolite membrane formation solution at greater than or equal to 10 degrees C. and less than or equal to 70 degrees C. and greater than or equal to pH10, and a step of forming a second zeolite membrane on the first zeolite membrane by hydrothermal synthesis in a state in which the porous support formed the first zeolite membrane is immersed in the second zeolite membrane formation solution. The first zeolite membrane and the second zeolite membrane share at least one composite building unit that constitutes a framework structure.

Advantageous Effects of Invention

According to the present invention, it is possible to provide a manufacturing method of a zeolite membrane structure that is configured to enable suppression of membrane defects.

DETAILED DESCRIPTION OF THE INVENTION

An embodiment of the present invention will be described below making reference to the figures. However, the figures are merely illustrative, and the actual ratios or the like of the respective dimensions may differ. Therefore, the specific dimensions or the like should be determined by making reference to the following description.

Configuration of Zeolite Membrane Structure 10

Figure 1:
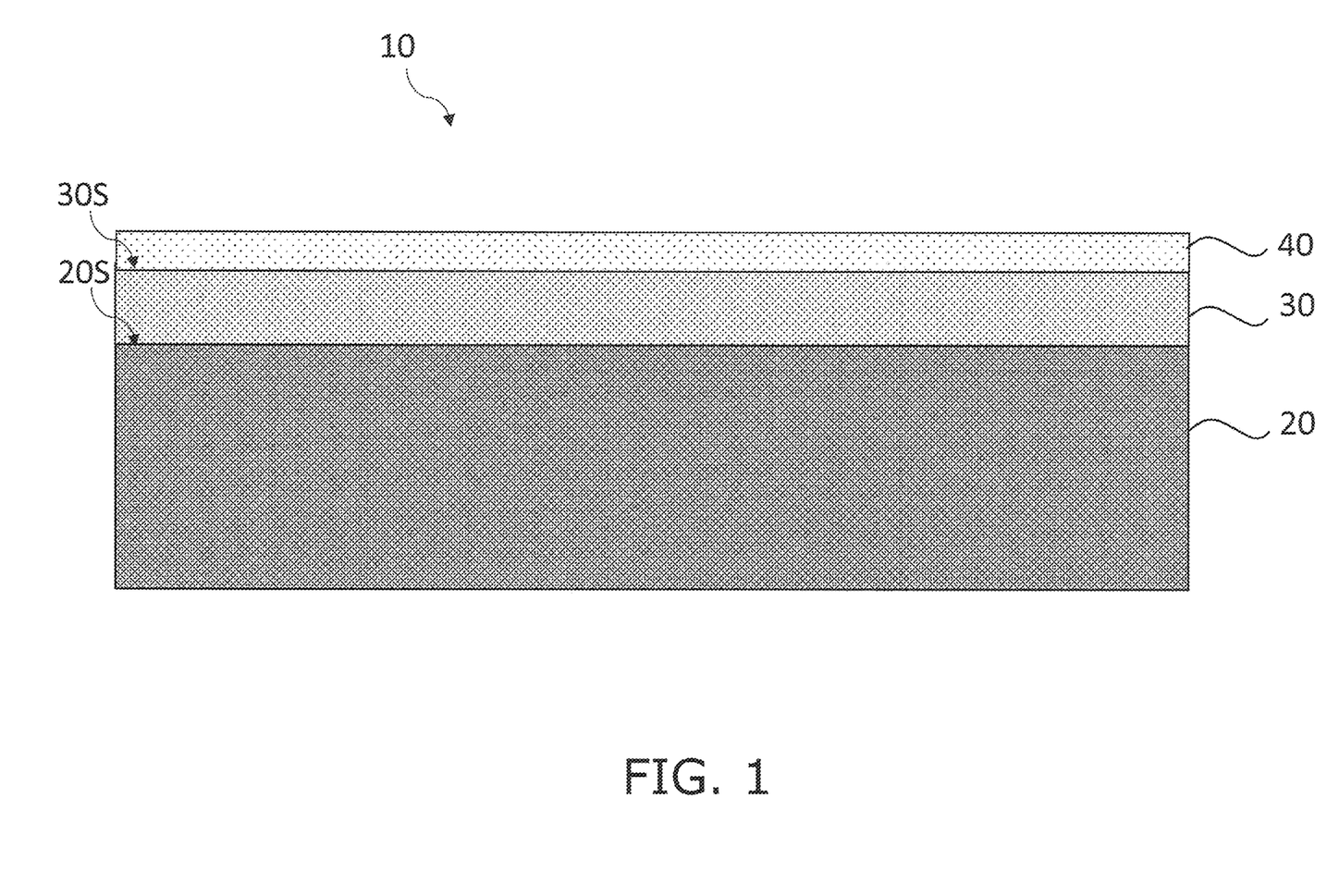
FIG. 1 is a cross-sectional view of a zeolite membrane structure.

A zeolite membrane structure 10 includes a porous support 20, a first zeolite membrane 30, and a second zeolite membrane 40.

The porous support 20 supports the first zeolite membrane 30 and the second zeolite membrane 40. The porous support 20 exhibits chemical stability to enable formation (crystallization or precipitation) of the first zeolite membrane 30 and the second zeolite membrane 40 on a surface 20S. The material constituting the porous support 20 includes for example, a sintered ceramic, a metal, an organic polymer, glass, carbon or the like. The sintered ceramic includes alumina, silica, mullite, zirconia, titania, yttria, silicon nitride, silicon carbide, or the like. The metal includes aluminum, iron, bronze, stainless steel, or the like. The organic polymer includes polyethylene, polypropylene, polytetrafluoroethylene, polysulfone, polyimide or the like.

The porous support 20 may be configured in a shape to enable supply a gas mixture or liquid mixture that is the object to be separated to the first zeolite membrane 30 and the second zeolite membrane 40. The shape of the porous support 20 for example may be configured in a honeycomb, monolithic, flat, tubular, cylindrical, columnar, or square column shape. However there is no limitation in this regard.

The porous support 20 has pores. The average pore diameter of the porous support 20 may be any size that enables transmission of a permeation component that permeates the first zeolite membrane 30 and the second zeolite membrane 40 in the object to be separated. When the average pore diameter of the porous support 20 increases, there is a tendency for the amount of the permeation component to increase. When the average pore diameter of the porous support 20 decreases, the strength of the porous support itself is increased and there is a tendency for the formation of a dense first zeolite layer 30 due to the flat configuration of the surface.

The porous support 20 may be a single-layered structure having the same average pore diameter or a multilayered structure having different average pore diameters. When the porous support 20 is a multilayered structure, each layer may be composed of different materials from among the materials described above or may be composed of the same material from among the material described above.

The first zeolite membrane 30 is formed on the surface 20S of the porous support 20. When the porous support 20 is formed in a honeycomb or monolithic shape, the first zeolite membrane 30 is formed on the inner side of the plural through holes in the porous support 20.

There is no particular limitation in relation to the framework structure (type) of the zeolite that forms the principal component of the first zeolite membrane 30 and, for example may include MFI, LTA, CHA, DDR, MOR, DOH, FAU, OFF/ERI, LTL, FER, BEA, BEC, CON, MSE, MEL, MTW, MEI, MWW, RHO, BOG, SZR, EMT, SOD, AEI, AEL, AEN, AET, AFN, AFO, AFR, AFS, AFT, AFI, AFX, ANA, CAN, GIS, GME, HEU, JBW, KFI, LAU, LEV, MAZ, MER, MFS, MTT, PHI, SFG, TUN, TON, UFI, VET, VFI, VNI, and VSV or the like. In particular, MFI, DDR, MEL, BEA, CHA, MOR, FAU, LTA, FER, SOD that facilitate crystallization of zeolite are preferred, and MFI, DDR, MEL, BEA, CHA that exhibit high chemical stability are particularly preferred. In the present embodiment, the term such that composition X "contains as a principal component" material Y means that material Y preferably occupies greater than or equal to 60 wt %, more preferably occupies greater than or equal to 70 wt %, and still more preferably occupies greater than or equal to 90 wt % of the total of composition X.

There is no particular limitation in relation to the Si/Al atomic ratio in the first zeolite membrane 30, and for example, it may be greater than or equal to 1.5, and is preferably greater than or equal to 200. A high silica zeolite with a Si/Al atomic ratio of greater than or equal to 200 substantially contains little or no aluminum. A configuration of the first zeolite membrane 30 as a high-silica zeolite enables sufficient surface activation of the first zeolite membrane 30 when forming the second zeolite membrane 40 as described below, and therefore enhances the adhesive characteristics of the first zeolite membrane 30 and the second zeolite membrane 40. Furthermore a configuration of the first zeolite membrane 30 as a high-silica zeolite enhances the corrosion resistance of the first zeolite membrane 30 and therefore reduces membrane defects.

The Si/Al atomic ratio in the first zeolite membrane 30 can be adjusted by controlling the blending and reaction conditions of the starting material solution in hydrothermal synthesis as described below. The Si/Al atomic ratio in the first zeolite membrane 30 can be measured by SEM-EDX (scanning electron microscope energy dispersive X-ray spectroscopy).

The first zeolite membrane 30 may contain an inorganic binder (such as silica or alumina), an organic binder (such as a polymer), or a silylating agent, or the like.

The first zeolite membrane 30 is formed into a membrane shape. There is no particular limitation in relation to the thickness of the first zeolite membrane 30 and for example it may be 0.1 micrometers to 10 micrometers. When the first zeolite membrane 30 has a thin configuration, there is a tendency for the permeation amount to increase, and when the first zeolite membrane 30 has a thick configuration, there is a tendency for the selectivity and membrane strength to be enhanced. However, when the first zeolite membrane 30 has an excessively thin configuration, cracks may be produced in the membrane and selectivity may be reduced. The thickness of the first zeolite membrane 30 can be adjusted by controlling the hydrothermal synthesis time or the synthesis temperature.

The first zeolite membrane 30 includes pores. There is no particular limitation in relation to the average pore diameter of the first zeolite membrane 30 and it can be adjusted according to the object to be separated. The average pore diameter of the first zeolite membrane 30 is a value derived from the composition and framework structure. The average pore diameter of the first zeolite membrane 30 is taken to be the arithmetic mean of the long diameter and short diameter of the largest pore in a pore structure of at least an oxygen 8-membered ring that is present in the framework structure. The average pore diameter of the first zeolite membrane 30 may be for example 0.2 nanometers to 2.0 nanometers.

The second zeolite membrane 40 is formed on the surface 30S of the first zeolite membrane 30. There is no particular limitation in relation to the framework structure of the zeolite contained as a principal component in the second zeolite membrane 40, and the same substance as the first zeolite membrane 30 described above may be used. In particular, MFI, DDR, MEL, BEA, CHA, MOR, FAU, LTA, FER, SOD that facilitate zeolite crystallization are preferred.

The composite building units in the second zeolite membrane 40 preferably share at least one of the composite building units in the first zeolite membrane 30. The composite building unit is a unit structure that configures the framework structure of the zeolite. Details of the composite building unit in zeolites are disclosed at The International Zeolite Association (IZA) "Database of Zeolite Structures" [online], [searched Nov. 21, 2014], Internet <URL: http://www.iza-structure.org/databases/>. Sharing at least one composite building unit enables enhancement of the adhesive characteristics of the first zeolite membrane 30 and the second zeolite membrane 40, the membrane formation of the second zeolite membrane 40, and the separation performance of the first zeolite membrane 30 and the second zeolite membrane 40. In particular, a configuration in which the first zeolite membrane 30 has the same framework structure as the second zeolite membrane 40 is more preferred since all the composite building units are shared.

There is no particular limitation on the Si/Al atomic ratio in the second zeolite membrane 40, and for example, it may be less than 200, and is preferably less than or equal to 60. A low-silica zeolite having an Si/Al atomic ratio of less than or equal to 60 has the characteristic of enabling introduction of a greater number of cations. A configuration of the second zeolite membrane 40 as a low-silica zeolite imparts a variety of functions to the second zeolite membrane 40. Consequently, the formation of the second zeolite membrane 40 on the first zeolite membrane 30 increases the density of the second zeolite membrane 40 as a functional layer in a thin membrane configuration.

The Si/Al atomic ratio in the second zeolite membrane 40 may be different from the Si/Al atomic ratio in the first zeolite membrane 30. In particular, when the framework structure of the first zeolite membrane 30 and the second zeolite membrane 40 is the same, a configuration in which the Si/Al atomic ratio in the first zeolite membrane 30 and the Si/Al atomic ratio in the second zeolite membrane 40 are different is preferred since a structure will be obtained that stacks zeolites with different functions. The Si/Al atomic ratio in the second zeolite membrane 40 can be adjusted by controlling the blending and reaction conditions of the starting material solution in hydrothermal synthesis as described below. The Si/Al atomic ratio in the second zeolite membrane 40 can be measured by SEM-EDX.

The second zeolite membrane 40 may include an inorganic binder, an organic binder, or a silylating agent, or the like.

The second zeolite membrane 40 is formed into a membrane form. A configuration in which the second zeolite membrane 40 is formed in a membrane form enables further enhancement to the separation performance of the zeolite membrane structure 10 when compared to a configuration in which zeolite particles are fixed onto the surface 30S of the first zeolite membrane 30.

In the present embodiment, if the second zeolite membrane 40 has a membrane shape, when observing the surface of the second zeolite membrane using SEM, it means that greater than or equal to 80% of the surface 30S of the first zeolite membrane 30 is covered. It is particularly preferred that greater than or equal to 90% of the surface 30S of the first zeolite membrane 30 is covered by the second zeolite membrane 40. When the coverage of the second zeolite membrane 40 is higher, it is possible to further improve the separation performance of the zeolite membrane structure 10. Observation of a membrane cross section with STEM (scanning transmission electron microscope) simply enables confirmation that the second zeolite membrane 40 has a membrane configuration as a result of the band-shaped distribution of the second zeolite membrane 40 along the surface direction.

There is no particular limitation in relation to the thickness of the second zeolite membrane 40, and for example it may be 0.1 micrometers to 3.0 micrometers. When the second zeolite membrane 40 is thin, there is a tendency for the permeation amount to increase, and when the second zeolite membrane 40 is thick, there is a tendency for the selectivity and membrane strength to be enhanced. When the thickness of the second zeolite membrane 40 is less than 0.1 micrometers, selectivity may be reduced. When it takes a value of greater than or equal to 3.0 micrometers, cracks may be formed in the second zeolite membrane 40 and selectivity may be reduced. The thickness of the second zeolite membrane 40 can be adjusted by controlling the hydrothermal synthesis time or the synthesis temperature.

The first zeolite membrane 30 includes pores. There is no particular limitation in relation to the average pore diameter of the second zeolite membrane 40 and it can be adjusted according to the object to be separated. The average pore diameter of the second zeolite membrane 40 is taken to be the arithmetic mean of the long diameter and short diameter of the largest pore in a pore structure of at least an oxygen 8-membered ring that is present in the framework structure. The average pore diameter of the second zeolite membrane 40 may be for example 0.2 nanometers to 2.0 nanometers.

Method of Manufacturing Zeolite Membrane Structure

A method of manufacturing a zeolite membrane structure 10 will be described.

Firstly starting materials for a porous support 20 are molded into a desired shape by use of extrusion molding, a press molding method, a slip cast method, or the like.

Then, the green body for the porous support 20 is fired (for example, 900 degrees C. to 1450 degrees C.) and both end portions are sealed using glass to thereby form the porous support 20.

Next, the first zeolite membrane 30 is formed on the surface 20S of the porous support 20. The method of forming the first zeolite membrane 30 includes use of a known method such as a hydrothermal synthesis method depending on the framework structure of the zeolite membrane. For the formation of the first zeolite membrane 30, a zeolite seed crystal may be used, or may not be used.

When using a zeolite seed crystal, a first zeolite membrane-forming seed crystal is prepared using conventional techniques. For example, when forming a CHA-type zeolite membrane as the first zeolite membrane 30, a structure transformation method for a FAU-type zeolite as disclosed in M. Itakura et al., Chemistry Letters vol. 37, No. 9 (2008) 908 can be used. When forming a DDR-type zeolite membrane as the first zeolite membrane 30, the method described in Japanese Patent Application Laid-Open No. 2004-83375 can be used.

Then, after coating the seeding slurry liquid, that includes a dispersion of a first zeolite membrane-forming seed crystal, onto the surface of the porous support 20, the seeding slurry liquid is air dried.

Next, the first zeolite membrane formation solution is prepared using conventional techniques. For example, when forming a CHA-type zeolite membrane as a first zeolite membrane 30, the method described in Japanese Patent Application Laid-Open No. 2011-16123 may be used. When forming a DDR-type zeolite membrane as the first zeolite membrane 30, the method described in Japanese Patent Application Laid-Open No. 2004-83375 can be used. It is noted that adjusting the mixing ratio of the Si source (silica sol or the like) and the Al source (sodium aluminate or the like) in the first zeolite membrane formation solution enables adjustment to the Si/Al atomic ratio in the first zeolite membrane 30.

Then, a first zeolite membrane 30 is formed on the porous support 20 by hydrothermal synthesis in a state in which the porous substrate 20 is immersed in the first zeolite membrane formation solution. The hydrothermal synthesis conditions may be conventionally known conditions (reference is made to Japanese Patent Application Laid-Open No. 2004-83375 and Japanese Patent Application Laid-Open No. 2011-16123). Controlling the hydrothermal synthesis time or the synthesis temperature enables the thickness of the first zeolite membrane 30 to be adjusted.

If an organic template is contained in the first zeolite membrane 30, the organic template may be combusted and removed after the formation of the first zeolite membrane 30 or may be combusted and removed after the formation of the second zeolite membrane 40. It is more preferred to combust and remove the organic template after formation of the first zeolite membrane 30 since even when a defect is produced by removal of the organic template in the first zeolite membrane 30, the defect can be covered with the second zeolite membrane 40.

Next, a second zeolite membrane formation solution is prepared. The method for preparing the second zeolite membrane formation solution includes use of a conventional method depending on the framework structure of the second zeolite membrane 40. At this time, the amount of a template (1-adamantane amine or the like) or an alkali compound is adjusted so that the pH of the second zeolite membrane formation solution is greater than or equal to 10. A pH of greater than or equal to 10.5 is more preferred, and greater than or equal to 11 is particularly preferred. When the pH is greater than or equal to 10, a surface activating effect described below can be imparted. Furthermore, although there is no particular limitation in relation to the upper pH limit, a value of less than or equal to 14 is preferred in light of inhibiting excessive corrosion of the first zeolite membrane 30.

Furthermore when a template is contained in the second zeolite membrane formation solution, it is possible to promote zeolite crystallization in hydrothermal synthesis as described below. Adjusting the mixing ratio of the Si source and the Al source of the second zeolite membrane formation solution enables adjustment of the Si/Al atomic ratio in the second zeolite membrane 40.

Next, a second zeolite membrane formation solution is made greater than or equal to 10 degrees C. and less than or equal to 70 degrees C., and the porous support 20 formed the first zeolite membrane 30 is immersed for greater than or equal to 5 minutes. In this manner, the surface is activated since the framework structure is exposed on the entire surface after removal of foreign matter that has adhered to the surface of the first zeolite membrane 30. As a result, the adhesive characteristics between the first zeolite membrane 30 and the second zeolite membrane 40 are enhanced, and it is possible to suppress membrane defects in the second zeolite membrane 40. During immersion, as long as the temperature of the second zeolite membrane formation solution sets within the range of greater than or equal to 10 degrees C. and less than or equal to 70 degrees C., the temperature of the second zeolite membrane formation solution may be varied. Furthermore, although there is no particular limitation in relation to the upper limit of the time for immersion of the porous support 20 formed the first zeolite membrane 30 in the second zeolite membrane formation solution, in view of productivity, a value of less than or equal to 100 hours is preferred, and less than or equal to 50 hours is more preferred.

Then, the second zeolite membrane 40 is formed on the first zeolite membrane 30 by hydrothermal synthesis in a state in which the porous support 20 formed the first zeolite membrane 30 is immersed in the second zeolite membrane formation solution. The hydrothermal synthesis conditions may be conventionally known conditions. However, after the formation of the second zeolite membrane 40, it is preferred that control is performed so that the weight of the second zeolite membrane 40 is greater than the total weight of the second zeolite precipitated in the second zeolite membrane formation solution. In this manner, it is possible to reduce the free zeolite that is suspended in a second zeolite membrane formation solution and thereby it is possible to further suppress membrane defects in the second zeolite membrane 40

Incidentally, when an organic template is contained in the second zeolite membrane 40, it is preferred that the nitrogen gas permeation rate of the second zeolite membrane 40 before combustion and removal of the organic template is preferably less than or equal to 0.75 nmol/(m$^2$·s·Pa). Furthermore, when an organic template is not used in the formation of the second zeolite membrane 40 (when an organic template is not contained in the second zeolite membrane 40), it is preferred that the nitrogen gas permeation rate of the second zeolite membrane 40 after sufficient exposure of the second zeolite membrane 40 to a saturated water vapor atmosphere is preferably less than or equal to 0.75 nmol/(m$^2$·s·Pa). A nitrogen gas permeation rate of less than or equal to 0.75 nmol/(m$^2$·s·Pa) means that the second zeolite membrane 40 is formed in a membrane configuration.

A solution containing the desired cations is brought into contact with the zeolite membrane structure 10 to thereby enable ion exchange. When an organic template is contained in the first zeolite membrane 30 or the second zeolite membrane 40 of the zeolite membrane structure 10, ion exchange may be performed after combustion and removal of the organic template. In this manner, it is possible to obtain a zeolite membrane structure 10 into which desired cations have been introduced. The time or the number of occasions of ion exchange, the concentration or temperature of the solution containing the cations may be set as required. The type of cation may be selected depending on the function to be imparted to the zeolite membrane structure 10. The zeolite membrane structure 10 preferably contains at least one type of cation selected from the group consisting of alkali metals, alkaline earth metals, Au, Ag, Cu, Ni, Co, Pd and Pt.

OTHER EMBODIMENTS

The present invention is not limited to the above embodiment, and various changes or modifications may be added within a scope that does not depart from the scope of the invention.

For example, in the above embodiment, the second zeolite membrane 40 is formed without using the second zeolite membrane forming seed crystals. However the second zeolite membrane forming seed crystals may be used to form the second zeolite membrane 40 in the same manner as the first zeolite membrane 30. However, a technique that does not use the second zeolite membrane forming seed crystal is preferred in light of the fact that it is possible to enhance the adhesion characteristics of the second zeolite membrane 40.

It is noted that the term "does not use a seed crystal" in the above embodiment not only denotes a configuration in which a seed crystal is not used at all but also denotes a concept that includes a configuration in which a seed crystal is present to a degree that does not affect the adhesion characteristics of the second zeolite membrane 40. More specifically, a seed crystal is deemed to not be used in a substantial manner when in a configuration in which the content amount of the second zeolite membrane forming seed crystals in the second zeolite membrane formation solution is less than or equal to 0.1 wt %, or when a configuration in which the mass per unit surface area of the second zeolite forming seed crystals attached on the surface of the first zeolite membrane 30 is less than or equal to 0.01 g/cm$^2$.

In the above embodiment, the zeolite membrane structure 10 is provided with the first zeolite membrane 30 stacked on the porous support 20 and the second zeolite membrane 40. However a functional membrane or protective membrane stacked onto the second zeolite membrane 40 may be provided. This type of functional membrane or protective membrane is not limited to a zeolite membrane, and includes an inorganic membrane such as a carbon membrane or silica membrane or the like, or an organic membrane such as a polyimide membrane or silicone membrane or the like.

EXAMPLES

Examples of a zeolite membrane structure according to the present invention will be described below. However, the present invention is not limited to the examples that are described below.

Preparation of Sample No. 1

A zeolite membrane structure according to Sample No. 1 is prepared as described below.

Firstly 20 parts by weight of an inorganic binding material 20 is added to 100 parts by weight of alumina particles having an average particle diameter of 30 micrometers, and then water, a dispersant and a thickener are added and kneaded to prepare a porous material.

Then the prepared a porous material is subjected to extrusion molding to form a green body for a monolithic alumina substrate. Next, the alumina substrate green body is fired (1250 degrees C., 1 hour) to form an alumina substrate. Then, PVA (organic binder) is added to alumina to prepare a slurry, and a green body for the surface layer is formed on the inner cell surface of the alumina substrate by filtration of the slurry. Then, after the green body for the surface layer is fired (1250 degrees C., 1 hour), both ends of the alumina substrate are sealed with glass to thereby prepare a monolithic alumina support.

Next, a high silica MFI-type zeolite membrane having an Si/Al atomic ratio of greater than or equal to 200 is formed as a first zeolite membrane on the inner cell surface of the alumina support. More specifically, firstly, MFI-type zeolite seed crystals (Si/Al atomic ratio ≥200) are diluted with ethanol, and the seeding slurry solution prepared to have a concentration of 0.1 mass % is caused to flow into the cell of the alumina support. Next, the inner portion of the cell is air-dried under predetermined conditions (room temperature, air velocity 5 m/s, 10 min). Then, after mixing 0.86 g of 40 mass % tetrapropylammonium hydroxide solution (manufactured by SACHEM, Inc.) and 0.45 g of tetrapropylammonium bromide (manufactured by Wako Pure Chemical Industries), 192.0 g of distilled water and 6.75 g of about 30 mass % silica sol (trade name: Snowtex S, manufactured by Nissan chemical Industries, Ltd.) are added and stirred with a magnetic stirrer (room temperature, 30 minutes) to prepare a sol for membrane formation. The resulting membrane formation sol is placed in a fluororesin inner cylinder (internal volume 300 ml) of a stainless steel pressure vessel and then the alumina support with MFI-type zeolite seed crystals attached is immersed and reacted for 20 hours in a hot air drying apparatus at a temperature of 160 degrees C. to thereby form a high silica MFI-type zeolite membrane. Then, the alumina support is washed and dried for greater than or equal to 12 hours at 80 degrees C. Next, the alumina support is heated to 500 degrees C. in an electric furnace and retained for 4 hours to remove the tetrapropylammonium from the high silica MFI-type zeolite membrane.

Next, a low silica MFI-type zeolite membrane having an Si/Al atomic ratio of 20 is formed as a second zeolite membrane on the surface of high silica MFI-type zeolite membrane. More specifically, after mixing 6.28 g of 40 mass % tetrapropylammonium hydroxide solution (manufactured by SACHEM, Inc.), 4.97 g of tetrapropylammonium bromide (manufactured by Wako Pure Chemical Industries), 26.3 g of sodium hydroxide (manufactured by Sigma-Aldrich), and 0.54 g of aluminum sulfate (manufactured by Wako Pure Chemical Industries), 147.1 g of distilled water and 14.8 g of about 30 mass % silica sol (trade name: Snowtex S, manufactured by Nissan chemical Industries, Ltd.) are added and stirred with a magnetic stirrer (room temperature, 30 minutes) to prepare a sol for membrane formation. After the resulting membrane formation sol maintained at a temperature of 10 degrees C. to 20 degrees C. is placed in a fluororesin inner cylinder (internal volume 300 ml) of a stainless steel pressure vessel, and the alumina support formed the high silica MFI-type zeolite membrane is immersed for 5 minutes, a low silica MFI-type zeolite membrane is formed by reacting for 10 hours in a hot air drying apparatus at a temperature of 160 degrees C. Then, the alumina support is washed and dried for greater than or equal to 12 hours at 80 degrees C. Next, the alumina support is heated to 500 degrees C. in an electric furnace and retained for 4 hours to remove the tetrapropylammonium from the low silica MFI-type zeolite membrane.

Next, an ion exchange solution that is adjusted to 0.1 mol/L by adding water to silver nitrate (manufactured by Kanto Chemical) is retained for 24 hours in contact with the second zeolite membrane to thereby introduce Ag as a cation into the second zeolite membrane. Thereafter, the second zeolite membrane is rinsed with water and dried (70 degrees C., 12 hours).

Preparation of Sample No. 2

Firstly, an alumina support that is the same as Sample No. 1 is prepared.

Next, a high silica MFI-type zeolite membrane that is the same as Sample No. 1 is formed as the first zeolite membrane on an inner cell surface of the alumina support.

Then, a low silica MFI-type zeolite membrane is formed as the second zeolite membrane on the surface of the first zeolite membrane. More specifically, apart from the feature of placing the membrane formation sol maintained at a temperature of 65 degrees C. to 70 degrees C. in a fluororesin inner cylinder of a stainless steel pressure vessel and immersing the alumina support forming the high silica MFI-type zeolite membrane for 10 hours, a second zeolite membrane is formed by the same steps as No. 1. It is noted that the cation introduction process by ion exchange is not performed in relation to the second zeolite membrane.

Preparation of Sample No. 3

Firstly, an alumina support that is the same as Sample No. 1 is prepared.

Next, a high silica MFI-type zeolite membrane that is the same as Sample No. 1 is prepared as the first zeolite membrane on an inner cell surface of the alumina support.

Then, a low silica MFI-type zeolite membrane is formed as the second zeolite membrane on the surface of the first zeolite membrane. More specifically, apart from the feature of placing the membrane formation sol maintained at a temperature of 0 degrees C. in a fluororesin inner cylinder of a stainless steel pressure vessel and immersing the alumina support forming the high silica MFI-type zeolite membrane for 10 hours, a second zeolite membrane is formed by the same steps as No. 1. It is noted that the cation introduction process by ion exchange is not performed in relation to the second zeolite membrane.

Preparation of Sample No. 4

Firstly, an alumina support that is the same as Sample No. 1 is prepared.

Next, a high silica MFI-type zeolite membrane that is the same as Sample No. 1 is prepared as the first zeolite membrane on an inner cell surface of the alumina support.

Then, a low silica MFI-type zeolite membrane is formed as the second zeolite membrane on the surface of the first zeolite membrane. More specifically, apart from the feature of placing the membrane formation sol maintained at a temperature of 90 to 95 degrees C. in a fluororesin inner cylinder of a stainless steel pressure vessel and immersing the alumina support forming the high silica MFI-type zeolite membrane for 5 minutes, a second zeolite membrane is formed by the same steps as No. 1. It is noted that the cation introduction process by ion exchange is not performed in relation to the second zeolite membrane.

Preparation of Sample No. 5

Firstly, an alumina support that is the same as Sample No. 1 is prepared.

Next, a high silica MFI-type zeolite membrane that is the same as Sample No. 1 is prepared as the first zeolite membrane on an inner cell surface of the alumina support.

Then, a low silica MFI-type zeolite membrane is formed as the second zeolite membrane on the surface of the first zeolite membrane. More specifically, apart from the further feature that sulfuric acid is dripped into the membrane formation sol to configure a pH of 9.5, a second zeolite membrane is formed by the same steps as No. 1. It is noted that the cation introduction process by ion exchange is not performed in relation to the second zeolite membrane.

Preparation of Sample No. 6

Firstly, an alumina support that is the same as Sample No. 1 is prepared.

Next, a high silica MFI-type zeolite membrane that is the same as Sample No. 1 is prepared as the first zeolite membrane on an inner cell surface of the alumina support.

Then, a low silica MFI-type zeolite membrane is formed as the second zeolite membrane on the surface of the first zeolite membrane. More specifically, apart from the feature that 12.56 g of 40 mass % tetrapropyl ammonium hydroxide solution (manufactured by SACHEM) is used in substitution for 6.28 g of 40 mass % of tetrapropyl ammonium hydroxide solution (manufactured by SACHEM) and 4.97 of tetrapropylammonium bromide (manufactured by Wako Pure Chemical Industries, Ltd.), a second zeolite membrane is formed by the same steps as No. 1. Then Ag cation introduction is performed in relation to the second zeolite membrane in the same manner as Sample No. 1.

Preparation of Sample No. 7

Firstly, an alumina support that is the same as Sample No. 1 is prepared.

Next, a high silica MFI-type zeolite membrane that is the same as Sample No. 1 is prepared as the first zeolite membrane on an inner cell surface of the alumina support.

Then, MFI-type zeolite seed crystals (Si/Al atomic ratio=20) are diluted with ethanol, and the seeding slurry solution prepared to have a concentration of 0.1 mass % is caused to flow into the cells of the alumina support. Next, the inner portion of the cell is air-dried under predetermined conditions (room temperature, air velocity 5 m/s, 10 min). Then, a low silica MFI-type zeolite membrane is formed as the second zeolite membrane on the surface of the first zeolite membrane. More specifically, the second zeolite membrane is formed by the same steps as Sample No. 1. It is noted that the cation introduction process by ion exchange is not performed in relation to the second zeolite membrane.

Preparation of Sample No. 8

Firstly, an alumina support that is the same as Sample No. 1 is prepared.

Then, a high silica DDR-type zeolite membrane having an Si/Al atomic ratio of greater than or equal to 200 is formed as the first zeolite membrane on an inner cell surface of the alumina support. More specifically, DDR-type zeolite seed crystals (Si/Al atomic ratio ≥200) are diluted with ethanol, and the seeding slurry solution prepared to have a concentration of 0.1 mass % is caused to flow into the cells of the alumina support. Next, the inner portion of the cell is air-dried under predetermined conditions (room temperature, air velocity 5 m/s, 10 min). Then, after placing 7.35 g of ethylene diamine (manufactured by Wako Pure Chemical Industries, Ltd.) in a fluororesin wide-mouth container, 1.16 g of 1-adamantane amine (manufactured by Aldrich) is added and dissolved so that no 1-adamantane amine precipitate remains. Next, 98.0 g of 30 wt % silica sol (trade name: Snowtex S, manufactured by Nissan Chemical Industries, Ltd.) and 116.5 g of distilled water are mixed in a separate container, stirred gently, and added to the wide-mouth container and stirred to thereby prepare a sol for membrane formation. The resulting membrane formation sol is placed in a fluororesin inner cylinder (internal volume 300 ml) of a stainless steel pressure vessel, and the alumina support with the DDR-type zeolite seed crystals attached is immersed and reacted for 10 hours in a hot air drying apparatus at a temperature of 130 degrees C. to thereby form a high silica DDR-type zeolite membrane. Then, the alumina support is washed and dried for greater than or equal to 12 hours at 80 degrees C. Then, the alumina support is heated to 450 degrees C. in an electric furnace and retained for 50 hours to thereby combust and remove the 1-adamantane amine from the high silica DDR-type zeolite membrane.

Next, a low silica DDR-type zeolite membrane having an Si/Al atomic ratio of 40 is formed as a second zeolite membrane on the surface of high silica DDR-type zeolite membrane. More specifically, firstly, after placing 152.4 g of distilled water in a fluororesin wide-mouthed container (internal volume 500 ml), 1.32 g of 1-adamantane amine (manufactured by Aldrich), 0.35 g sodium hydroxide (manufactured by Sigma-Aldrich), 52.6 g of 30 wt %/o silica sol: (trade name: Snowtex S, Nissan chemical Industries, Ltd.) and 0.36 g of sodium aluminate acid (manufactured by Wako Pure Chemical Industries, Ltd.) are added and stirred to thereby prepare a membrane formation sol. After the resulting membrane formation sol maintained at a temperature of 20 degrees C. to 30 degrees C. is placed in a fluororesin inner cylinder (internal volume 300 ml) of a stainless steel pressure vessel, and the alumina support formed the high silica DDR-type zeolite membrane is immersed for 5 minutes, a low silica DDR-type zeolite membrane is formed by reacting for 12 hours in a hot air drying apparatus at a temperature of 160 degrees C. Then, the alumina support is washed, and dried for greater than or equal to 12 hours at 80 degrees C. Then, the alumina support is heated to 450 degrees C. in an electric furnace and retained for 50 hours to thereby combust and remove the 1-adamantane amine from the low silica DDR-type zeolite membrane. Then the Ag cation introduction process is performed in relation to the second zeolite membrane in the same manner as Sample No. 1.

Preparation of Sample No. 9

Firstly, an alumina support that is the same as Sample No. 1 is prepared.

Next, a high silica DDR-type zeolite membrane that is the same as Sample No. 8 is prepared as the first zeolite membrane on an inner cell surface of the alumina support.

Next, a DDR-type zeolite membrane that is the same as Sample No. 8 is prepared as the second zeolite membrane on the surface of the high silica DDR-type zeolite membrane.

Then, Li introduced as cations into the second zeolite membrane by adding water to lithium chloride (manufactured by Kanto Kagaku) to achieve 0.1 mol/L and maintaining the Li ion exchange solution in contact with the second zeolite membrane for 24 hours. Thereafter the second zeolite membrane is rinsed with water and dried (70 degrees C., 12 hours).

Preparation of Sample No. 10

Firstly, an alumina support that is the same as Sample No. 1 is prepared.

Next, a high silica MFI-type zeolite membrane that is the same as Sample No. 1 is prepared as the first zeolite membrane on an inner cell surface of the alumina support.

Next, a high silica BEA-type zeolite membrane having an Si/Al atomic ratio of greater than or equal to 200 is formed as a second zeolite membrane on the surface of high silica MFI-type zeolite membrane. More specifically, firstly 87.7 g of 35 mass % tetraethylammonium hydroxide (manufactured by Sigma-Aldrich), 34.9 g of distilled water and 83.5 g of about 30 mass % of a silica sol (trade name: Snowtex S, manufactured by Nissan Chemical) are mixed and stirred with a magnetic stirrer (room temperature, 90 minutes) to thereby prepare a sol for membrane formation. After the resulting membrane formation sol maintained at a temperature of 20 degrees C. to 30 degrees C. is placed in a fluororesin inner cylinder (internal volume 300 ml) of a stainless steel pressure vessel and immersing the alumina support formed the high silica MFI-type zeolite membrane for 1 hour, a high silica BEA-type zeolite membrane is formed by reacting for 20 hours in a hot air drying apparatus at a temperature of 140 degrees C. Then, the alumina support is washed and dried for greater than or equal to 12 hours at 80 degrees C. Then, the alumina support is heated to 500 degrees C. in an electric furnace and retained for 4 hours to remove the tetraethylammonium hydroxide from the high silica BEA-type zeolite membrane. It is noted that the cation introduction process by ion exchange is not performed in relation to the second zeolite membrane.

Preparation of Sample No. 11

Firstly, an alumina support that is the same as Sample No. 1 is prepared.

Next, a FAU-type zeolite membrane having an Si/Al atomic ratio of 2 is formed as a first zeolite membrane on the inner cell surface of the alumina support. More specifically, FAU-type zeolite seed crystals (Si/Al atomic ratio=2.8) are diluted with ethanol, and the seeding slurry solution prepared to have a concentration of 0.1 mass % is caused to flow into the cells of the alumina support. Next, the inner portion of the cell is air-dried under predetermined conditions (room temperature, air velocity 5 m/s, 10 min). Then, after mixing 16.0 g of sodium hydroxide (manufactured by Sigma-Aldrich), 1.6 g of sodium aluminate acid (manufactured by Wako Pure Chemical Industries, Ltd.), and 137.0 of distilled water, 45.5 g of about 30 mass % silica sol (trade name: Snowtex S, manufactured by Nissan chemical Industries, Ltd.) is added and stirred with a magnetic stirrer (room temperature, 30 minutes) to thereby prepare a sol for membrane formation. After placing the resulting membrane formation sol in a fluororesin inner cylinder (internal volume 300 ml) of a stainless steel pressure vessel, and immersing the alumina support with the FAU-type zeolite seed crystals attached, an FAU-type zeolite membrane is formed by reacting for 24 hours in a hot air drying apparatus at a temperature of 160 degrees C. Then, the alumina support is washed and dried for greater than or equal to 12 hours at 80 degrees C.

Next, an LTA-type zeolite membrane having an Si/Al atomic ratio of 1 is formed as the second zeolite membrane on the surface of the FAU-type zeolite membrane. More specifically, firstly, after mixing 67.4 g of 25 mass % of tetramethyl ammonium hydroxide (manufactured by Sigma Aldrich), 14.1 g of aluminum sulfate (manufactured by Wako Pure Chemical Industries, Ltd.), 0.47 g of sodium hydroxide (manufactured by Sigma-Aldrich), and 107.4 g of distilled water, 35.6 g of about 30 wt % silica sol (trade name: Snowtex S, manufactured by Nissan Chemical Industries, Ltd.) is added and stirred with a magnetic stirrer (room temperature, 30 minutes) to thereby prepare a sol for membrane formation. After the resulting membrane formation sol maintained at a temperature of 10 degrees C. to 20 degrees C. is placed in a fluororesin inner cylinder (internal volume 300 ml) of a stainless steel pressure vessel, and the alumina support formed the FAU-type zeolite membrane is immersed for 15 minutes, an LTA-type zeolite membrane is formed by reacting for 10 hours in a hot air drying apparatus at a temperature of 115 degrees C. Then, the alumina support is washed and dried for greater than or equal to 12 hours at 80 degrees C. Next, the alumina support is heated to 450 degrees C. in an electric furnace and retained for 4 hours to remove the tetramethyl ammonium from the LTA-type zeolite membrane. It is noted that the cation introduction process by ion exchange is not performed in relation to the second zeolite membrane.

Preparation of Sample No. 12

Firstly, an alumina support that is the same as Sample No. 1 is prepared.

Next, a high silica MFI-type zeolite membrane that is the same as Sample No. 1 is prepared as the first zeolite membrane on an inner cell surface of the alumina support.

Then, a high silica DDR-type zeolite membrane having an Si/Al atomic ratio of greater than or equal to 200 is formed as the second zeolite membrane on the surface of the high silica MFI-type zeolite membrane. More specifically, firstly after placing 7.35 g of ethylene diamine (manufactured by Wako Pure Chemical Industries, Ltd.) in a fluororesin wide-mouth container, 1.16 g of 1-adamantane amine (manufactured by Aldrich) is added and dissolved so that no 1-adamantane amine precipitate remains. Next, 98.0 g of 30 wt % silica sol (trade name: Snowtex S, manufactured by Nissan Chemical Industries, Ltd.) and 116.5 g of distilled water are added to a separate container, stirred gently, and then added to the wide-mouth container and stirred to thereby prepare a sol for membrane formation. After the resulting membrane formation sol maintained at a temperature of 20 degrees C. to 30 degrees C. is placed in a fluororesin inner cylinder (internal volume 300 ml) of a stainless steel pressure vessel, and the alumina support formed the high silica MFI-type zeolite membrane is immersed for 1 hour and then reacted in a hot air drying apparatus for 12 hours at a temperature of 130 degrees C. to thereby form a high silica DDR-type zeolite membrane. Then, the alumina support is washed and dried for greater than or equal to 12 hours at 80 degrees C. Next, the alumina support is heated to 450 degrees C. in an electric furnace and retained for 50 hours to thereby combust and remove the 1-adamantane amine from the high silica DDR-type zeolite membrane. It is noted that the cation introduction process by ion exchange is not performed in relation to the second zeolite membrane.

Preparation of Sample No. 13

Firstly, an alumina support that is the same as Sample No. 1 is prepared.

Next, a high silica MFI-type zeolite membrane that is the same as Sample No. 1 is prepared as the first zeolite membrane on an inner cell surface of the alumina support.

Then, DDR-type zeolite seed crystals (Si/Al atomic ratio ≥200) are diluted with ethanol, and the seeding slurry solution prepared to have a concentration of 0.1 mass % is caused to flow into the cells of the alumina support. Next, the inner portion of the cell is air-dried under predetermined conditions (room temperature, air velocity 5 m/s, 10 min). Then, a high silica DDR-type zeolite membrane is formed as the second zeolite membrane on the surface of the first zeolite membrane. More specifically, the second zeolite membrane is formed by the same steps as Sample No. 12. It is noted that the cation introduction process by ion exchange is not performed in relation to the second zeolite membrane.

Preparation of Sample No. 14

Firstly, an alumina support that is the same as Sample No. 1 is prepared.

Next, a high silica DDR-type zeolite membrane that is the same as Sample No. 8 is prepared as the first zeolite membrane on an inner cell surface of the alumina support.

Next, an LTA-type zeolite membrane that is the same as Sample No. 11 is prepared as the second zeolite membrane on the surface of the high silica DDR-type zeolite membrane. It is noted that the cation introduction process by ion exchange is not performed in relation to the second zeolite membrane.

Preparation of Sample No. 15

Firstly, an alumina support that is the same as Sample No. 1 is prepared.

Next, a high silica DDR-type zeolite membrane that is the same as Sample No. 8 is prepared as the first zeolite membrane on an inner cell surface of the alumina support.

Then, LTA-type zeolite seed crystals (Si/Al atomic ratio=1) are diluted with water, and the seeding slurry solution prepared to have a concentration of 0.1 mass % is caused to flow into the cells of the alumina support. Next, the inner portion of the cell is air-dried under predetermined conditions (room temperature, air velocity 5 m/s, 10 min). Then, an LTA-type zeolite membrane is formed as the second zeolite membrane on the surface of the first zeolite membrane. More specifically, the second zeolite membrane is formed by the same steps as Sample No. 11. It is noted that the cation introduction process by ion exchange is not performed in relation to the second zeolite membrane.

pH of Sol for Forming Second Zeolite Membrane

The pH of the second zeolite membrane formation sol prepared in Sample Nos. 1 to 15 was measured and confirmed to be a pH of greater than or equal to 10 with the exception of Sample No. 5.

Denseness and Adhesive Characteristics of Second Zeolite Membrane

The following method is used to quantitatively measure the adhesive characteristics of the first zeolite membrane and the second zeolite membrane and the denseness and the second zeolite membrane in Sample Nos. 1 to 15.

The denseness of the second zeolite membrane is evaluated by confirmation of 20 random locations using SEM (1000× magnification) on the membrane surface of each sample to thereby calculate the surface coverage by the second zeolite membrane across the whole body. In Table 1, those samples in which the surface coverage of the first zeolite membrane by the second zeolite membrane is greater than or equal to 90% are denoted as A, those samples in which the surface coverage of the first zeolite membrane by the second zeolite membrane is greater than or equal to 80% and less than 90% are denoted as B, and those samples in which the surface coverage of the first zeolite membrane by the second zeolite membrane is less than 80% are denoted as C.

The adhesive characteristics of the first zeolite membrane and the second zeolite membrane are evaluated by confirmation of 20 random locations using SEM (2000× magnification) on the membrane surface of each sample to thereby calculate the proportion of gaps that occupy the interface between the first zeolite membrane and the second zeolite membrane across the whole body in the 20 locations. In Table 1, those samples in which a gap is not observed are denoted as A, those samples in which the proportion of gaps is less than 5% are denoted as B, those samples in which the proportion of gaps is greater than or equal to 5% and less than 10% are denoted as C, and those samples in which the proportion of gaps is greater than or equal to 10% are denoted as D.

Principal Precipitate of Second Zeolite Membrane

The following method is used to confirm the principal precipitate portion of the second zeolite membrane in Sample Nos. 1 to 15. The weight difference before and after the formation of the second zeolite membrane is taken to be "the weight of the second zeolite membrane". Further, after using centrifugation to recover the powder precipitated in the solution by second zeolite membrane synthesis, the weight of the powder obtained by washing and drying for greater than or equal to 12 hours at 80 degrees C. is taken to be "the total weight of the second zeolite precipitated in the second zeolite membrane formation solution". When "the weight of the second zeolite membrane" is greater than "the total weight of the second zeolite precipitated in the second zeolite membrane formation solution", the principal precipitate portion of the second zeolite is denoted as "membrane", and when this is not the case, the principal precipitate of the second zeolite is denoted as "solution".

TABLE 1

| | | Second Zeolite Membrane | | | | |
|---|---|---|---|---|---|---|
| Sample No. | First Zeolite Membrane Crystal Structure | Crystal Structure | pH of Membrane Formation Sol | Use of Seed Crystal | Temperature during Immersion of First Zeolite Membrane in Membrane Formation Sol | Immersion (hours) of First Zeolite Membrane in Membrane Formation Sol |
| 1 | High Silica MFI | Low Silica MFI | at least 10 | no | 10-20° C. | 5 minutes |
| 2 | High Silica MFI | Low Silica MFI | at least 10 | no | 65-70° C. | 10 hours |
| 3 | High Silica MFI | Low Silica MFI | at least 10 | no | 0° C. | 10 hours |
| 4 | High Silica MFI | Low Silica MFI | at least 10 | no | 90-95° C. | 5 minutes |
| 5 | High Silica MFI | Low Silica MFI | less than 10 | no | 10-20° C. | 5 minutes |
| 6 | High Silica MFI | Low Silica MFI | at least 10 | no | 10-20° C. | 5 minutes |
| 7 | High Silica MFI | Low Silica MFI | at least 10 | yes | 10-20° C. | 5 minutes |
| 8 | High Silica DDR | Low Silica DDR | at least 10 | no | 20-30° C. | 5 minutes |
| 9 | High Silica DDR | Low Silica DDR | at least 10 | no | 20-30° C. | 5 minutes |
| 10 | High Silica MFI | High Silica BEA | at least 10 | no | 20-30° C. | 1 hour |
| 11 | FAU | LTA | at least 10 | no | 10-20° C. | 15 minutes |
| 12 | High Silica MFI | High Silica DDR | at least 10 | no | 20-30° C. | 1 hour |
| 13 | High Silica MFI | High Silica DDR | at least 10 | yes | 20-30° C. | 1 hour |
| 14 | High Silica DDR | LTA | at least 10 | no | 10-20° C. | 15 minutes |
| 15 | High Silica DDR | LTA | at least 10 | yes | 10-20° C. | 15 minutes |

| Sample No. | Second Zeolite Membrane Main Precipitate Portion of Second Zeolite | Cation Introduced by Ion Exchange | Presence of Common Composite Building Unit | Denseness | Adhesive Characteristics |
|---|---|---|---|---|---|
| 1 | membrane | Ag | yes | A | A |
| 2 | membrane | — | yes | A | A |

TABLE 1-continued

| | | | | | |
|---|---|---|---|---|---|
| 3 | membrane | — | yes | A | D |
| 4 | membrane | — | yes | B | D |
| 5 | membrane | — | yes | B | D |
| 6 | solution | Ag | yes | A | B |
| 7 | membrane | — | yes | A | C |
| 8 | membrane | Ag | yes | A | A |
| 9 | membrane | Li | yes | A | A |
| 10 | membrane | — | yes | A | B |
| 11 | membrane | — | yes | B | B |
| 12 | solution | — | no | C | — |
| 13 | membrane | — | no | C | — |
| 14 | solution | — | no | C | — |
| 15 | membrane | — | no | C | — |

As shown in Table 1, the composite building units of the first zeolite membrane and the second zeolite membrane are shared, both the denseness and the adhesive characteristics of the first zeolite membrane and the second zeolite membrane are confirmed to be good in Sample Nos. 1, 2 and 6 to 11 in which the porous support formed the first zeolite membrane is immersed for at least 5 minutes in the second zeolite membrane formation solution at a temperature of at least 10 degrees C. and less than or equal to 70 degrees C. and at least a pH of 10.

When compared to Sample No. 7, the denseness of Sample Nos. 1, 2, 6 and 8 to 11 in which a seed crystal is not used for the second zeolite membrane formation is confirmed to be superior.

Particularly good adhesive characteristics are confirmed in Sample Nos. 1, 2, 8 and 9 in which the framework structure of the first zeolite membrane and the second zeolite membrane is the same.

However, adhesive characteristics are lower whether or not the framework structure is the same in those samples in which the principal precipitate portion of the second zeolite is denoted as "solution", that is to say, in Sample No. 6 in which the total weight of the second zeolite precipitated in the second zeolite membrane formation solution is greater than the weight of the second zeolite membrane. In light of this fact, it is understood that when the principal precipitate portion of the second zeolite is denoted as "membrane", a further enhancement to the adhesive characteristics is obtained.

Figure 2:
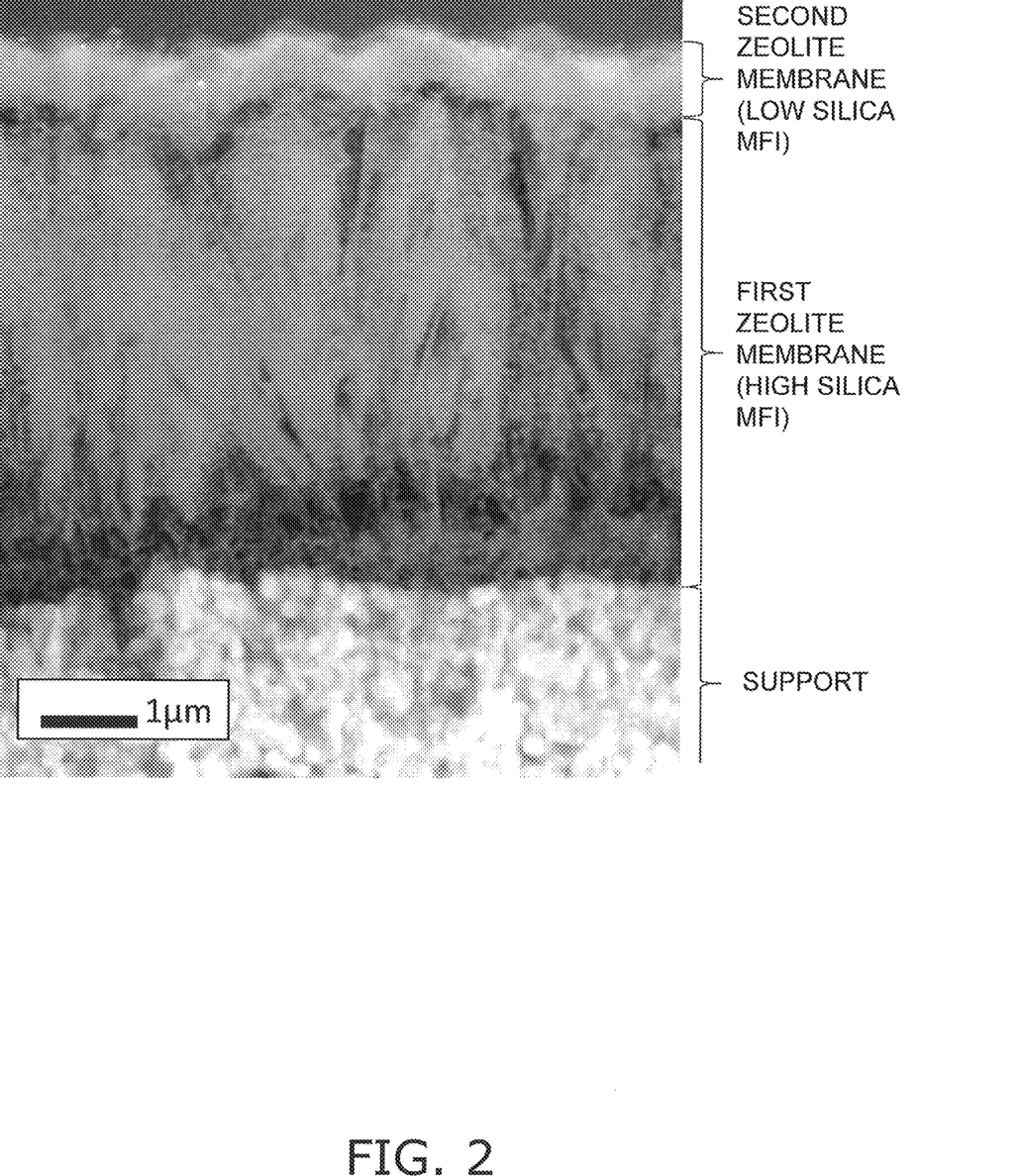
FIG. 2 is a cross-sectional HAADF image of a first zeolite membrane and a second zeolite membrane according to Sample No. 1.

Furthermore, after mechanical polishing the cross sectional surface of the first zeolite membrane and the second zeolite membrane in Sample Nos. 1, 2, 6 to 11, polishing is executed by use of an Ar ion milling (Dual Mill 600 manufactured by GATAN), and observation is performed using STEM (JEM2100F manufactured by JEOL, Ltd., acceleration voltage: 200 kV STEM beam diameter approximately 0.7 nmφ). As a result, the second zeolite membrane is confirmed in the above samples to be formed in a membrane configuration, and the adhesive characteristics of the first zeolite membrane and the second zeolite membrane are confirmed to be good. A HAADF (high-angle scattering annular dark-field) image of Sample No. 1 observed by STEM is shown in FIG. 2.

Separation Performance

The ethylene/ethane separation performance is evaluated in Sample Nos. 1, 6 and 8 that include introduction of Ag. A mixed gas of ethylene ($C_2H_4$) and ethane ($C_2H_6$) (volume ratio of each gas=50:50) at a temperature of 25 degrees C. is introduced into the cells at 0.4 MPa, and the gas that permeates the first zeolite membrane and the second zeolite membrane is subjected to component analysis using gas chromatography. As a result, Sample Nos. 1, 6 and 8 that include introduction of Ag are all shown to exhibit selective permeation of ethylene.

Next, the carbon dioxide/methane separation performance is evaluated in Sample No. 9 that include introduction of Li. A mixed gas of carbon dioxide ($CO_2$) and methane ($CH_4$) (volume ratio of each gas=50:50) at a temperature of 25 degree C. is introduced into the cells at 0.4 MPa, and the gas that permeates the first zeolite membrane and the second zeolite membrane is subjected to component analysis using gas chromatography. As a result, Sample No. 9 that includes introduction of Li is shown to exhibit selective permeation of carbon dioxide.

The invention claimed is:

1. A method for manufacturing a zeolite membrane structure comprising:
   a step of forming a first zeolite membrane on a porous support by hydrothermal synthesis in a state in which the porous support is immersed in a first zeolite membrane formation solution,
   a step of immersing the porous support and the first zeolite membrane formed on the porous support for greater than or equal to 1 hour in a second zeolite membrane formation solution at greater than or equal to 10 degrees C. and less than or equal to 70 degrees C. and greater than or equal to pH10 so as to activate an exposed surface of the first zeolite membrane, and
   a step of forming a second zeolite membrane on the first zeolite membrane by hydrothermal synthesis in a state in which the porous support and the first zeolite membrane formed on the porous support are immersed in the second zeolite membrane formation solution,
   the first zeolite membrane and the second zeolite membrane sharing at least one composite building unit constituting a framework structure,
   wherein the step of immersing the porous support and the first zeolite membrane formed on the porous support is performed before the step of forming the second zeolite membrane on the first zeolite membrane by hydrothermal synthesis.

2. The method for manufacturing a zeolite membrane structure according to claim 1, wherein
   a content amount of second zeolite membrane forming seed crystals in the second zeolite membrane formation solution is less than or equal to 0.1 wt %.

3. The method for manufacturing a zeolite membrane structure according to claim 1, wherein
   a mass per unit surface area of the second zeolite forming seed crystals attached on a surface of the first zeolite membrane is less than or equal to 0.01 g/cm$^2$.

4. The method for manufacturing a zeolite membrane structure according to claim 1, wherein after formation of the second zeolite membrane, a weight of the second zeolite membrane is greater than a total weight of second zeolite precipitated in the second zeolite membrane formation solution.

5. The method for manufacturing a zeolite membrane structure according to claim 1, wherein
a framework structure of the first zeolite membrane is the same as a framework structure of the second zeolite membrane.

6. The method for manufacturing a zeolite membrane structure according to claim 5, wherein
the Si/Al atomic ratio in the first zeolite membrane is different from the Si/Al atomic ratio in the second zeolite membrane.

7. The method for manufacturing a zeolite membrane structure according to claim 1, wherein
a framework structure of at least one of the first zeolite membrane and the second zeolite membrane is any of MFI, DDR, MEL, BEA, CHA, MOR, FAU, LTA, FER, and SOD.

8. The method for manufacturing a zeolite membrane structure according to claim 1, wherein the temperature range of the second zeolite membrane formation solution is greater than or equal to 10 degrees C. and less than or equal to 30 degrees C.

* * * * *